Patented June 3, 1952

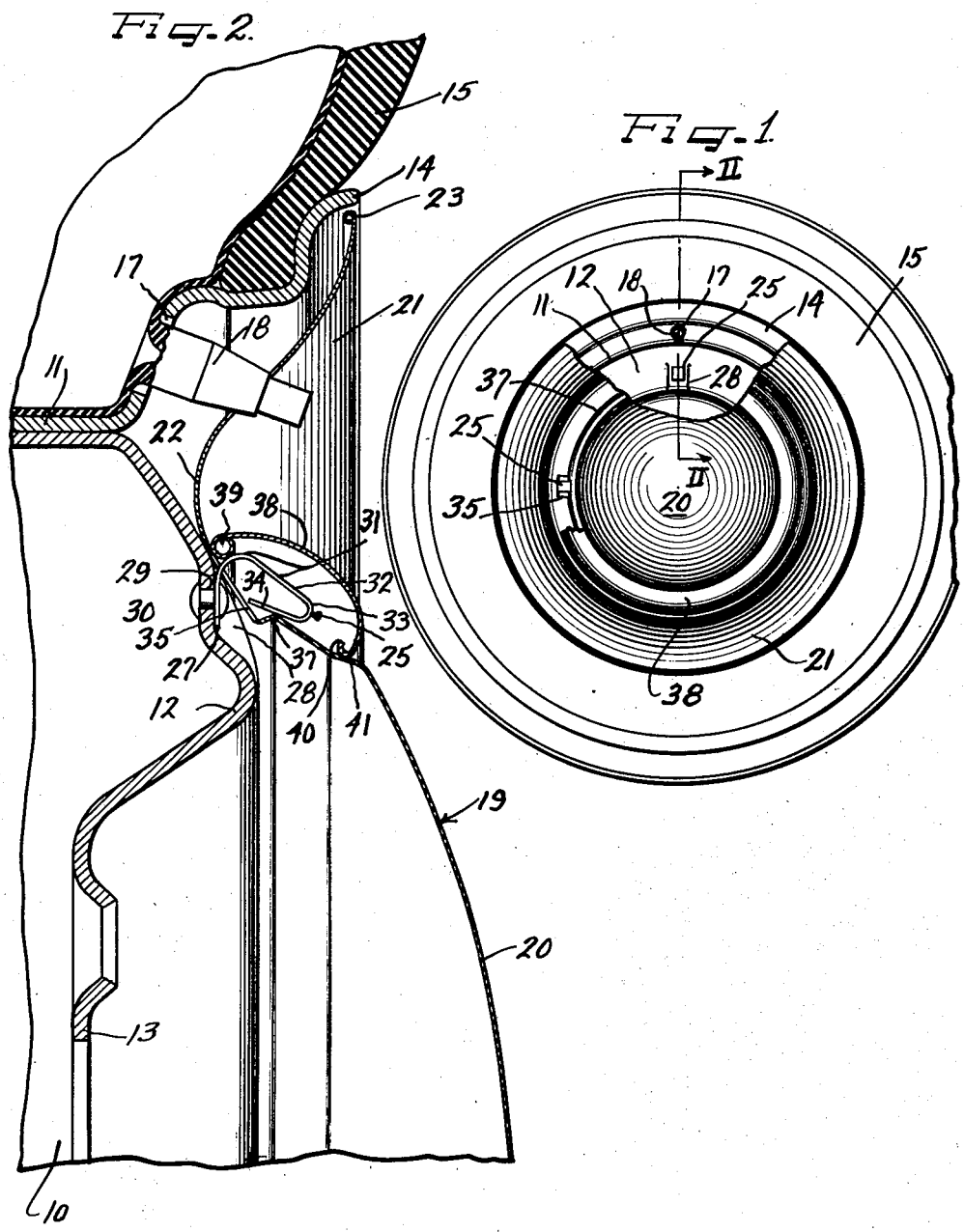

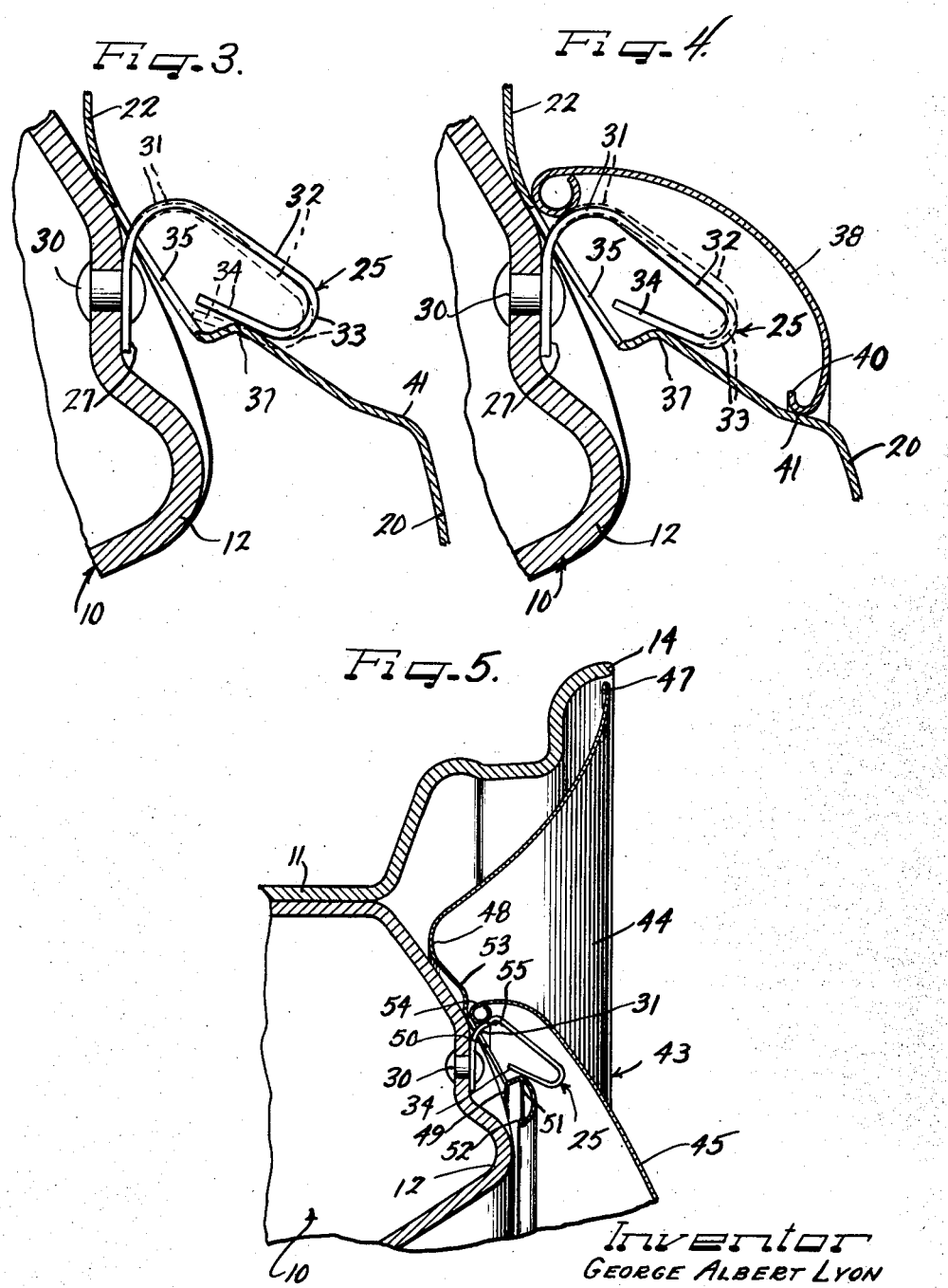

2,598,705

UNITED STATES PATENT OFFICE 2,598,705

WHEEL COVER

George Albert Lyon, Detroit, Mich.

Application April 1, 1947, Serial No. 738,513

14 Claims. (Cl. 301—37)

This invention relates to improvements in wheel structures and more particularly concerns improvements in the protective and ornamental covering of the outer side of a vehicle wheel.

An important object of the present invention is to provide improved means for removably attaching a cover to the outer side of a vehicle wheel.

Another object of the invention is to provide in a wheel structure an improved cover for the outer side thereof and novel means for retaining the cover on the wheel.

A further object of the invention is to provide a composite cover for the outer side of a vehicle wheel and which is adapted to be mounted upon the wheel in detachable relation in an improved manner whereby the cover is substantially locked against accidental dislodgement.

Yet another object of the invention is to provide in a composite cover for a vehicle wheel improved means for substantially locking the cover against becoming accidentally detached.

According to the general features of the invention there is provided a vehicle wheel structure including a tire rim and a body portion wherein the body portion has a series of cover retaining clips mounted thereon, and a cover is assembled with the wheel structure and includes a circular member for at least partially covering the outer side of the wheel and engageable in snap-on pry-off relation with the retaining clips, and a second circular cover member is retainingly engageable with the retaining clips after the first circular cover member has been applied to the wheel, the engagement of the second cover member with the clips wedging the clips into substantially locking tensioned engagement with the first cover member whereby to retain the cover assembly substantially against accidental dislodgment.

According to other features of the invention, the first cover member is of an extent and magnitude to cover not only the tire rim but also the wheel body and the second cover member is in the form of an ornamental annulus adapted to conceal the retaining clips and the portion of the first cover member engaged thereby.

According to further general features of the invention, the first cover member is in the form of a tire rim concealing annulus having a portion projecting radially inwardly over the wheel body and engageable with the retaining clips, and the second cover member comprises a hub cap for concealing the remainder of the body of the wheel and also concealing the retaining clips and the portion of the first cover engaged by the clips.

Other objects, features and advantages of the present invention will be readily apparent from the following detail description of certain preferred embodiments thereof taken in conjunction with the accompanying drawings, in which:

Figure 1 is a side elevational view of a wheel structure including the features of the present invention and with portions of the cover assembly broken away to reveal details of structure therebehind;

Figure 2 is an enlarged radial sectional view taken substantially on line II—II of Figure 1;

Figure 3 is a further enlarged fragmentary radial sectional view through the retaining clip carrying portion of the wheel body substantially in the plane indicated in Figure 2 and showing one phase of the assembly of the cover with the wheel;

Figure 4 is a sectional view similar to Figure 3 and showing the finally assembled relationship of the cover components; and Figure 5 is a radial sectional view through the wheel and showing a modified form of the cover applied thereto.

As shown on the drawings:

A vehicle wheel with which the present invention is adapted to be utilized comprises a wheel body 10 and a tire rim 11. The wheel body is adapted to be formed as a sheet metal stamping of suitable gauge and the tire rim is adapted to be formed as a rolled section and the two wheel members are adapted to be secured together in concentric relation in a preferred fashion.

The wheel body 10 is shown as including a generally axially outwardly protruding annular reinforcing nose bulge 12 and a central dished bolt-on flange 13 which is adapted to be secured by means of customary cap screws or bolts to a portion of the vehicle wheel axle (not shown).

The tire rim 11 is adapted to be of the customary drop center, multi-flanged type including an outer terminal flange 14 and constructed and arranged to support a pneumatic tire and tube assembly 15 therein. An opening 17 is formed in the side of the tire rim for projection therethrough of a valve stem 18.

Covering the outer side of the wheel is a cover assembly 19. In the form shown in Figures 1 and 2, this cover assembly comprises a one-piece circular cover member 20 the central portion of which is formed in substantially hub cap simulating shape and the outer marginal portion of which is formed in trim ring simulating shape as indicated at 21. The central and outer marginal portions 20 and 21 of the cover are divergently related by the provision of a relatively large radius generally axially inwardly extending annular junction rib 22 adapted to seat against the radially outer side of the nose bulge 12 of the wheel body.

The trim ring portion 21 of the cover is adapted to have the outer edge thereof reinforced by means of an inwardly turned reinforcing bead 23 which defines a diameter for the cover slightly less than the internal diameter of the tire rim terminal flange 14 and the outer edge of the trim ring cover portion is adapted to lie within the plane of the tire rim terminal flange so that the trim ring portion is protected against curbing damage or the like and so that the edge of the terminal flange affords a convenient fulcrum for a pry-off tool to be inserted behind the reinforced edge 23 for prying the cover free from the wheel. An opening 24 is provided in the trim ring cover portion 21 for projection of the valve stem 18.

From the reinforced edge 23 the trim ring cover portion 21 is preferably contoured on a generally convex cross-section in general simulation of the curvature of the tire side wall and where this portion is colored white it gives the impression of a white side wall of a massive tire.

For retaining the cover on the wheel, a plurality, such as four, retaining spring clips 25 is provided. Each clip is provided with a base flange 27 mounted within a depression 28 provided therefor in the nose bulge 12 of the wheel body, the base of the depression being formed preferably substantially parallel to the medial plane of the wheel and affording a radial reinforcing rib to compensate for any weakness that might otherwise inhere from an aperture 29 formed therethrough to receive a rivet 30 for attaching the base flange 27 against the wheel body.

From the radially outer end of the base flange 27 extends a generally radially outwardly and axially outwardly curving juncture bend 31 by which a radially inwardly and axially outwardly oblique body flange 32 is integrally connected with the base flange. The outer end of the body flange 32 has connected integrally therewith through the madium of a rounded nose 33 a retaining shoulder terminal flange 34 which extends obliquely axially inwardly and radially outwardly in under-turned spaced relation to the body flange 32.

In applying the cover member 20, clip receiving apertures 35 at the radially inner side of the reinforcing and seating rib 22 and at the base of the hub cap portion of the cover are disposed in registry with the respective retaining clips 25 and the cover pressed inwardly into retaining engagement with the clips. In this action, the radially inner edges defining the clip apertures 35 and which are disposed on a larger diameter than the diameter of the circle defined by the inner ends of the retaining clips as represented by the nose portions 33 thereof, are pressed against the nose portions 33 of the clips and the clips caused to deflect generally radially outwardly and snap through the respective apertures 35. Thereupon the retaining shoulder terminal flanges 34 of the clips engage retainingly against an annular radially outwardly protruding reinforcing rib 37 formed on the cover member immediately radially inwardly from the clip apertures 35. The reinforcing rib 37 is provided at its axially inner side with a generally radially and axially outwardly directed cam surface for engaging the nose portions 33 of the respective clips and flexing the clips generally radially outwardly past the rib and into snapping retaining engagement with the axially outer side of the rib. To remove the cover member 19 the reverse action is taken, that is a pry-off tool may be applied to the reinforced outer edge 23 and axially outward force applied to the cover to snap the same outwardly out of engagement with the spring retaining clips 25.

In order to place the retaining clips 25 under tensioned, wedging, locking retaining engagement with the cover, and to conceal the clip apertures 35 and the clips 25 from view, a locking member 38 in the form of an ornamental annulus is applied to the cover within the groove provided by the juncture rib 22. To this end, the annulus 38 is preferably formed of a convex ornamental bead form cross section and with the major transverse axis extending obliquely generally conforming to the radially outer side portion of the hub cap section of the cover. The radially outer margin of the annulus 38 is curled under to provide a reinforcing and clip engaging bead 39. The radially inner margin of the annulus 38 is preferably formed with an under-turned reinforcing flange 40 adapted to seat against the cover within a shallow annular indentation 41 providing a shoulder therefor.

In applying the locking annulus 38, it is pressed axially inwardly against the retaining clips 25 until the outer marginal bead 39, which is of an inner diameter somewhat less than the circle described by the maximum radially outer protrusion of the clip shoulders 31, until it snaps retainingly behind the clip shoulders 31. This results in the clips being wedgingly tensioned between the reinforcing rib 37 of the cover and the reinforcing bead 39 of the cover annulus 33 and substantially stiffened and locked against releasing the cover member 20.

Figures 3 and 4 depict the various steps in assembling the cover components. In Figure 3 the clip 25 is shown in broken outline as it appears before the cover member 20 is applied thereto, while the full outline form shows the same after the cover member 20 has been applied thereto and the clip is under tension which will normally hold the cover member 20 effectively on the wheel.

In Figure 4, the broken outline form of the clip 29 indicates the same as it appears before the locking annulus 38 is applied and substantially as the clip appears in the full line form of Figure 3. After the locking annulus 38 is applied, the clip, it will be observed, is placed under substantial radially inward compression so that it is deflected into the full line position where it maintains a strong wedging, tensioned engagement against the reinforcing rib 37 of the cover and also against the reinforcing bead 39 of the locking annulus. Thereby the cover assembly 19 is effectively clamped against the wheel body not only by the action of the spring clips 25 but also by the action of the retaining bead 39 of the locking annulus which is forced generally axially inwardly against the underlying portion of the cover member 20 within the groove of the juncture rib 22 and clamps it against the wheel body as is apparent. By preference the arrangement is such that the cover member 20 engages the wheel body only on a circle coincident with the circle of contact by the annulus bead edge 39. This minimizes interference with proper seating of the cover by possible irregularities in the surface of the wheel body.

In the modified form of the invention shown in Figure 5, a composite cover 43 of somewhat different form but essentially the same cooperative relationship with respect to the wheel structure and the retaining clips 25 is disclosed as comprising a trim ring component 44 and a hub cap component 45.

The trim ring component 44 of the cover comprises a substantially convex body portion which extends from a reinforced radially outer edge 47 generally radially and axially inwardly to an axially inwardly extending reinforcing rib 48 providing an integral rounded connection with a generally radially inwardly and axially outwardly extending inner section 49, which is adapted to seat against the radially outer side of the nose bulge 12 of the wheel body.

In the radially inner section 49 are provided a series of clip passage apertures 50 for the respective clips 25, an annular reinforcing bead 51 at the radially inner ends of the apertures 50 being receptive of the retaining shoulder flanges 34 of the clips. For reinforcement, the radially inner edge of the cover section 49 may be turned upon itself, as shown at 52, to provide a reinforced edge and the margin may be curved so as to provide a finished smooth appearance therefor.

At the radially outer sides of the clip apertures 50 a shoulder 53 is preferably formed on the cover section 49 to afford a centering engagement with a marginal bead 54 on the hub cap member 45 after the bead 54 has been pressed into retaining engagement behind the shoulders 31 of the respective clips 25. The coaction of the clips 25 with the cover members 44 and 45 is substantially the same as was described in connection with the form of Figure 2. That is, the cover member 44 is adapted to be applied initially to the wheel by snapping the same into place with respect to the clips 25 and thereafter the hub cap cover member 25 is pressed behind the clip shoulders 31. This causes the clips to be placed under locking tensioned, wedging engagement against both of the cover members, and the composite cover 43 is thereby held effectively against dislodgement until the hub cap cover member 45 is pried free by means such as a screw driver or the like applied between the reinforcing bead 54 and the shoulder 53.

For improving the latching engagement of the cover bead 54 with the clip shoulders 31, respective latching indentations 55 may be formed in such shoulders.

I claim as my invention:

1. In a vehicle wheel structure including a tire rim and a body portion wherein the body portion has a series of cover retaining clips mounted thereon, a cover assembled with the wheel structure and including a circular member for at least partially covering the outer side of the wheel and having apertures through which the clips project with portions at one side of the apertures engageable in snap-on pry-off relation with the retaining clips, said clip engageable portions being offset axially outwardly adjacent to the proximate edges of the apertures and having clip-engaging and flexing camming portions leading thereto, and a second circular cover member retainingly engageable with the retaining clips after the first circular cover member has been applied to the wheel, the engagement of the second cover member with the clips wedging the clips into substantially locking tensioned engagement with the clip-engageable portions of the first cover member whereby to retain the cover assembly substantially against accidental dislodgment.

2. In a vehicle wheel structure including a tire rim and a body portion wherein the body portion has a series of cover retaining clips mounted thereon, a cover assembled with the wheel structure and including a circular member for at least partially covering the outer side of the wheel and engageable in snap-on pry-off relation with the retaining clips, and a second circular cover member retainingly engageable with the retaining clips after the first circular cover member has been applied to the wheel, the engagement of the second cover member with the clips wedging the clips into substantially locking tensioned engagement with the first cover member whereby to retain the cover assembly substantially against accidental dislodgment, the first cover member being of an extent and magnitude to cover not only the tire rim but also the wheel body and the second cover member being in the form of an ornamental annulus adapted to conceal the retaining clips and the portion of the first cover member engaged thereby.

3. In a vehicle wheel structure including a tire rim and a body portion wherein the body portion has a series of cover retaining clips mounted thereon, a cover assembled with the wheel structure and including a circular member for at least partially covering the outer side of the wheel and engageable in snap-on pry-off relation with the retaining clips, and a second circular cover member retainingly engageable with the retaining clips after the first circular cover member has been applied to the wheel, the engagement of the second cover member with the clips wedging the clips into substantially locking tensioned engagement with the first cover member whereby to retain the cover assembly substantially against accidental dislodgment, the first cover member being in the form of a tire rim concealing annulus having a portion projecting radially inwardly over the wheel body and engageable with the retaining clips, the second cover member comprising a hub cap for concealing the remainder of the body of the wheel and also concealing the retaining clips and the portion of the first cover engaged by the clips.

4. In a vehicle wheel structure including a tire rim and a wheel body, cover retaining clips carried by the wheel body, a cover member engaging the wheel body and having respective apertures for receiving the clips therethrough, the clips engaging the outer side of said cover member retainingly, and a second cover member engaging the clips and locking the same against release of the first cover member.

5. In a vehicle wheel structure including a wheel body and a tire rim, a cover for the outer side of the wheel including a tire rim concealing portion and a portion engaging the wheel body, the wheel body having a plurality of retaining clips thereon having flexible retaining portions extending generally radially inwardly and including shoulder terminal flanges directed generally radially outwardly and facing generally axially inwardly, the cover member having means at the radially inner side of the clips for retaining engagement by said terminal flanges of the clips, and a second cover member engaging the clips at the radially outer side thereof and locking the same against release of the first cover member.

6. In combination in a vehicle wheel structure, a plurality of cover retaining clips carried by the wheel structure and including base portions having retaining shoulders at the radially outer ends thereof and integrally joining a generally radially inwardly and axially outwardly oblique body flange which has a retaining shoulder portion turned under and spaced from the base flange, a cover member having respective apertures for passage of the clips and means at the radially inner side of the apertures for retaining engagement with the radially inner retaining shoulder portions of the clips, and a second cover member including a beaded edge engaging said radially outer retaining shoulders and placing the clips under locking tension against the first cover member.

7. In a vehicle wheel structure of the character described, a first cover member having retaining clip apertures therethrough, an annular reinforcing shoulder formed at the radially inner side of the apertures, retaining clips extending through the apertures and retainingly engaging said shoulder, and a second cover member engaging the clips in radially outwardly spaced relative relation to said shoulder and at the radially outer side of the apertures and resiliently wedging the clips against said shoulder.

8. In a vehicle wheel structure, retaining clips on the wheel structure, each of said clips including a respective base portion and a flexible retaining portion joining the base portion on a cover-retaining juncture shoulder directed generally radially outwardly, a cover member engaging the wheel structure at the radially outer side of the clips, and having a portion thereof retainingly engaging the flexible retaining portions of the clips at the radially inner side of the clips, and a second cover member engaging said cover-retaining shoulders of the clips at the radially outer side of the clips and being wedged by the clips against the first cover member to clamp the latter against the wheel.

9. In a vehicle wheel structure, a wheel body having a generally axially outwardly protruding annular reinforcing nose portion, said nose portion having an annularly spaced series of radially extending reinforcing depressions, cover retaining clips secured in said depressions, said clips having generally radially outwardly extending and radially inwardly turned retaining portions, a cover assembly including a first cover member engaging the clips and retained thereby on the nose portion of the wheel body, and a second cover member engaging the clips and lockingly wedging the same against the first cover member.

10. In a vehicle wheel structure, a body portion having a plurality of retaining clips including radially outer and radially inner cover retaining portions, a first wheel cover member engaged by the radially inner portions of the clips, and a second cover member superimposed on said first cover member and engaging the radially outer retaining portions of the clips, said radially outer retaining portions of the clips including respective latching indentations.

11. In a vehicle wheel structure, a body portion having a plurality of retaining clips including radially outer and radially inner cover retaining portions, a first wheel cover member engaged by the radially inner portions of the clips, and a second cover member superimposed on said first cover member and engaging the radially outer retaining portions of the clips, said first cover member including a portion extending to a substantial extent radially inwardly beyond the clips and a reinforcing rib in the form of an outwardly projecting intermediate portion of the first cover member at the radially outer side of said radially inwardly extending portion of the first cover member, said reinforcing rib being disposed adjacent to and being retainingly engaged by the clips.

12. In a vehicle wheel structure, a body portion having a plurality of retaining clips respectively including radially outer cover-retaining shoulders and radially inner cover-retaining terminal flange portions, a first wheel cover member engaged by the radially inner flange portions of the clips, and a second cover member superimposed on said first cover member and engaging the radially outer retaining shoulders of the clips.

13. In combination in a vehicle wheel structure, a plurality of cover retaining clips carried by the wheel structure and including base portions having retaining shoulders at the radially outer ends thereof and integrally joining a generally radially inwardly and axially outwardly oblique body flange which has a retaining shoulder portion turned under and spaced from the base flange, said retaining shoulders having generally radially outwardly opening latching indentations, a cover member having respective apertures for passage of the clips and means at the radially inner sides of the apertures for retaining engagement with the radially inner retaining shoulders portions of the clips, and a second cover member including a portion engaging said radially outer retaining shoulders in said latching indentations and placing the clips under locking tension against the first cover member.

14. In a vehicle wheel structure including a supporting portion, a plurality of cover-retaining clips carried by the supporting portion, each of said clips comprising a base portion in engagement with said supporting portion, generally radially outwardly directed retaining shoulders at the respective radially outer ends of the clip base portions, a generally radially inwardly and axially outwardly oblique body flange extending from each of said retaining shoulders, an underturned retaining shoulder terminal flange extending from the radially inner end portions of the respective body flanges of the clips, a cover member engageable in snap-on pry-off relation with and at the axially inner sides of said terminal flange portions, and a second cover member retainingly engageable in snap-on pry-off relation with said retaining shoulders and acting on the clips through said retaining shoulders to place the clips under locking tension against the first cover member.

GEORGE ALBERT LYON.

REFERENCES CITED

The following references are of record in the file of this patent:

UNITED STATES PATENTS

| Number | Name | Date |
|---|---|---|
| 2,368,254 | Lyon | Jan. 30, 1945 |
| 2,386,226 | Lyon | Oct. 9, 1945 |
| 2,401,492 | Lyon | June 4, 1946 |